(12) United States Patent
Oslake et al.

(10) Patent No.: US 7,552,036 B2
(45) Date of Patent: Jun. 23, 2009

(54) PRECONDITIONING FOR STOCHASTIC SIMULATION OF COMPUTER SYSTEM PERFORMANCE

(75) Inventors: John M. Oslake, Seattle, WA (US); Pavel A. Dournov, Redmond, WA (US); Glenn Peterson, Kenmore, WA (US); Jonathan Hardwick, Kirkland, WA (US); Efstathios Papaefstathiou, Redmond, WA (US); David Guimbellot, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 281 days.

(21) Appl. No.: 11/107,623

(22) Filed: Apr. 15, 2005

(65) Prior Publication Data

US 2006/0235675 A1    Oct. 19, 2006

(51) Int. Cl.
    *G06F 17/10* (2006.01)
(52) U.S. Cl. .................................................. 703/2
(58) Field of Classification Search .................... 703/2, 703/13, 22
    See application file for complete search history.

(56) References Cited

U.S. PATENT DOCUMENTS

| | | | |
|---|---|---|---|
| 4,631,363 A | 12/1986 | Foster et al. | |
| 5,388,196 A | 2/1995 | Pajak et al. | |
| 5,838,319 A | 11/1998 | Guzak et al. | |
| 5,920,700 A | 7/1999 | Gordon et al. | |
| 5,953,724 A | 9/1999 | Lowry | |
| 5,978,576 A | 11/1999 | Sanadidi et al. | |
| 6,192,470 B1 | 2/2001 | Kelley et al. | |
| 6,301,701 B1 * | 10/2001 | Walker et al. | ............... 717/125 |
| 6,496,842 B1 | 12/2002 | Lyness | |
| 7,096,178 B2 | 8/2006 | Gluhovsky | |
| 7,149,731 B2 | 12/2006 | Dettinger et al. | |
| 2002/0178075 A1 | 11/2002 | Emerick et al. | |
| 2003/0046396 A1 * | 3/2003 | Richter et al. | ............... 709/226 |
| 2003/0163298 A1 | 8/2003 | Odom et al. | |
| 2003/0167381 A1 | 9/2003 | Herscovich et al. | |
| 2003/0176993 A1 * | 9/2003 | Lines et al. | ................... 703/22 |
| 2004/0049372 A1 * | 3/2004 | Keller | ......................... 702/22 |
| 2004/0107219 A1 | 6/2004 | Rosenberger | |
| 2004/0181794 A1 | 9/2004 | Coleman et al. | |
| 2005/0027661 A1 | 2/2005 | Lober et al. | |
| 2005/0102121 A1 | 5/2005 | Odhner et al. | |
| 2005/0125401 A1 | 6/2005 | Carr et al. | |
| 2005/0195165 A1 | 9/2005 | Mitchell | |
| 2006/0047813 A1 | 3/2006 | Aggarwal et al. | |

(Continued)

OTHER PUBLICATIONS

J.P. Buzen, "Fundamental Operational Laws of Computer System Performance", 1976, Acta Informatica, vol. 7, pp. 167-182.*

(Continued)

*Primary Examiner*—Kidest Bahta
*Assistant Examiner*—Russ Guill
(74) *Attorney, Agent, or Firm*—Lee & Hayes, PLLC

(57) ABSTRACT

Preconditioning for stochastic simulation of computer system performance is described. In an embodiment, methods taught herein include preconditioning a performance scenario that is simulated as part of a software deployment. The performance scenario specifies devices included as part of a hardware configuration supporting the software. The performance scenario can be modified based, at least in part, on the result of the preconditioning. Other methods taught herein include two complementary techniques for preconditioning performance scenarios, referred to as pseudo-simulation and workload aggregation.

20 Claims, 8 Drawing Sheets

U.S. PATENT DOCUMENTS

2006/0112130 A1 5/2006 Lowson
2006/0161417 A1 7/2006 Hardwick et al.
2006/0167704 A1 7/2006 Nicholls et al.

OTHER PUBLICATIONS

Daniel A. Menasce et al., "Performance by Design: Computer Capacity Planning by Example", 2004, Prentice Hall, 24 unnumbered pages.*

Yung-Hsiang Lu et al., "Operating-System Directed Power Reduction", 2000, International Symposium on Low Power Electronics and Design, pp. 37-42.*

Marc, "Free Windows Explorer replacement with tabbed UI", Apr. 7, 2004, pp. 2.

PCT Search Report Application No. PCT/US06/09245, Mailed on Oct. 30, 2007, pp. 7.

PCT Search Report Application No. PCT/US06/09161, Mailed on Oct. 16, 2007, pp. 7.

PCT Search Report Application No. PCT/US06/09282 Mailed on Dec. 4, 2007, pp. 7.

* cited by examiner

PRECONDITIONING FOR STOCHASTIC SIMULATION OF COMPUTER SYSTEM PERFORMANCE

TECHNICAL FIELD

This invention relates to systems and methods for preconditioning the stochastic simulation of computer system performance.

BACKGROUND

When computer software is deployed to a new customer site, or when existing software is upgraded at a customer site, several issues may arise. One issue is determining what devices are included in the deployment to enable the software to perform according to customer or vendor specifications. Suitable examples of devices in this context can include computer desktops or servers and networking infrastructure. Having identified what devices are included, other issues include determining how many of the above devices are to be included, and/or determining what performance characteristics should be specified for these devices.

Modeling techniques based on simulation and other quantitative methods are known for analyzing the performance of software deployments. However, conventional modeling techniques have several shortcomings that can limit their applicability in some circumstances. First, persons using conventional modeling techniques may repeat the simulation each time any device configuration is adjusted to evaluate the effect of the change, and then repeat this process until some goal is achieved. However, if each repetition of the simulation is time consuming, then repeating each simulation may unnecessarily prolong the overall modeling process.

Also, persons using conventional modeling techniques may be asked to provide relatively detailed technical information on the devices included as part of a proposed performance scenario. Thus, these persons may be technically sophisticated, and their time is valued accordingly. If the overall modeling process is long, then it consumes more of their valuable time, and the cost of the modeling process increases. Also, if only these technically sophisticated persons can fully utilize the modeling techniques, then an enterprise investing in these modeling techniques may be unnecessarily restricted in realizing return from this investment.

The teachings herein address the above and other shortcomings in conventional techniques for modeling software deployments.

SUMMARY

Methods and systems for preconditioning the stochastic simulation of computer system performance are described herein.

In an implementation of preconditioning the stochastic simulation of computer system performance, methods taught herein include preconditioning a performance scenario that is simulated to model a software deployment. The performance scenario specifies a usage profile and deployment characteristics. The performance scenario can be modified based, at least in part, on the result of the preconditioning.

Other methods taught herein include two complementary processes for preconditioning performance scenarios, referred to as pseudo-simulation and workload aggregation.

The pseudo-simulation process taught herein provides methods that include generating one or more sample transactions for each transaction type associated with the simulated deployment. Action latency statistics are determined that represent a duration of time over which the device would process each transaction. Instantaneous device utilization statistics are determined that represent a level of utilization experienced by the device when processing the action. These statistics are determined by invoking a device model for each action to evaluate the action workload. An overall device utilization statistic is determined based on action latency statistics, instantaneous device utilization statistics, and frequencies of each transaction type. This overall device utilization statistic represents the level at which the device is utilized in a performance scenario, and indicates whether it is appropriate to add or substitute devices in the performance scenario.

The workload aggregation process taught herein provides methods that include generating one or more sample transactions for each transaction type associated with the simulated deployment. Action costs associated with each transaction are rescaled as appropriate. The action costs of each transaction type are weighted by transaction frequency and aggregated for each service that generated the actions. An instantaneous device utilization statistic associated with processing the aggregated action cost on the device is determined. An action latency statistic representing a duration of time over which the device would process all actions is determined. These statistics are determined by invoking the device model to evaluate the aggregate workload for all actions. An overall device utilization statistic is determined based on the action latency statistic and the instantaneous device utilization statistic.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

While aspects of the described systems and methods of preconditioning for stochastic simulation of computer system performance can be implemented in any number of different computing systems, environments, and/or configurations, embodiments for preconditioning for stochastic simulation of computer system performance are described in the context of the following exemplary system architectures and processes.

Figure 1:
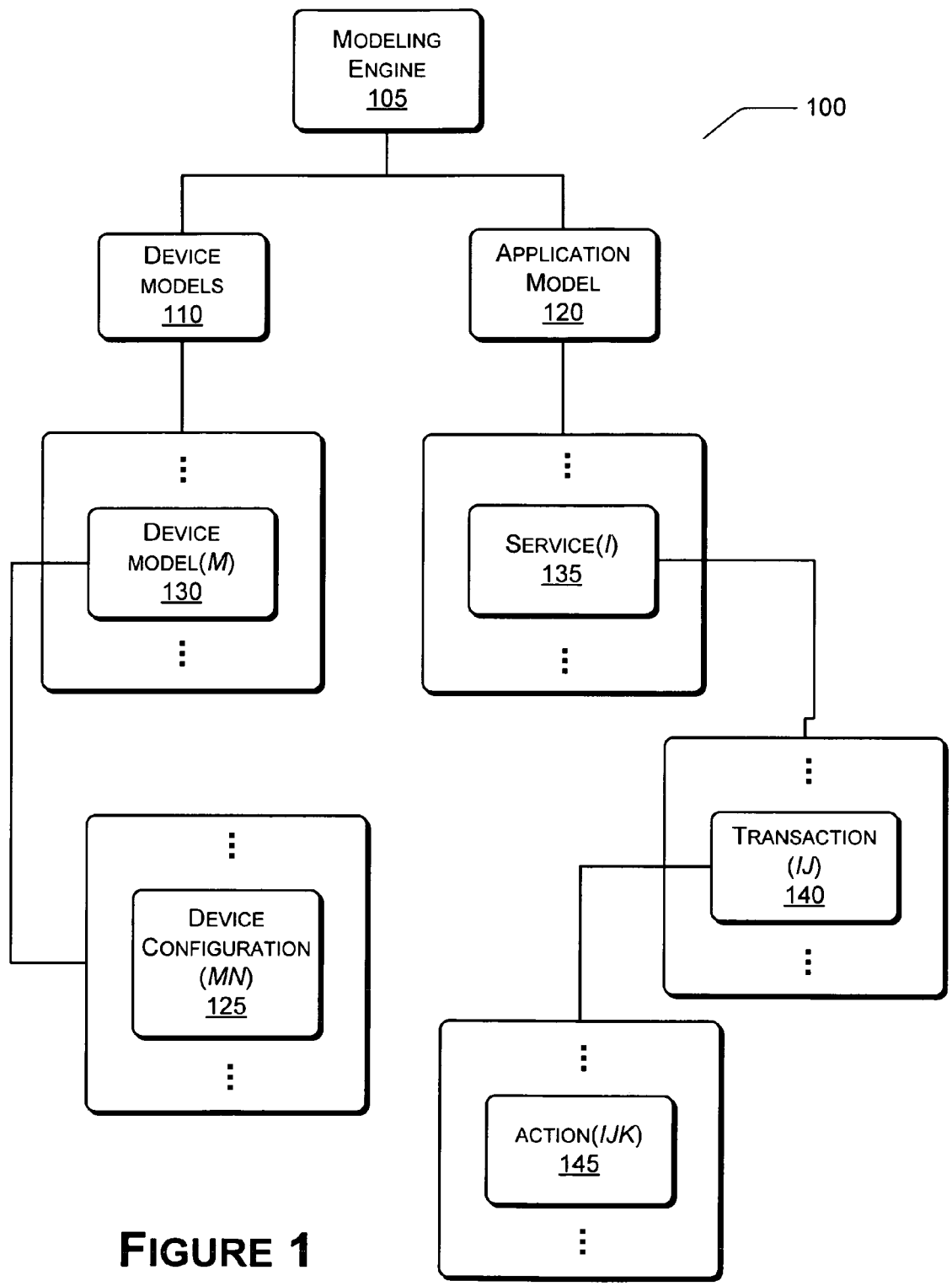
FIG. 1 is a block diagram of a state of a modeling system before a performance scenario is created.

FIG. 1 illustrates a state 100 of a modeling system before creation of a performance scenario. The state of the modeling system after creation of the performance scenario is shown in FIG. 2 and discussed below.

Figure 2:
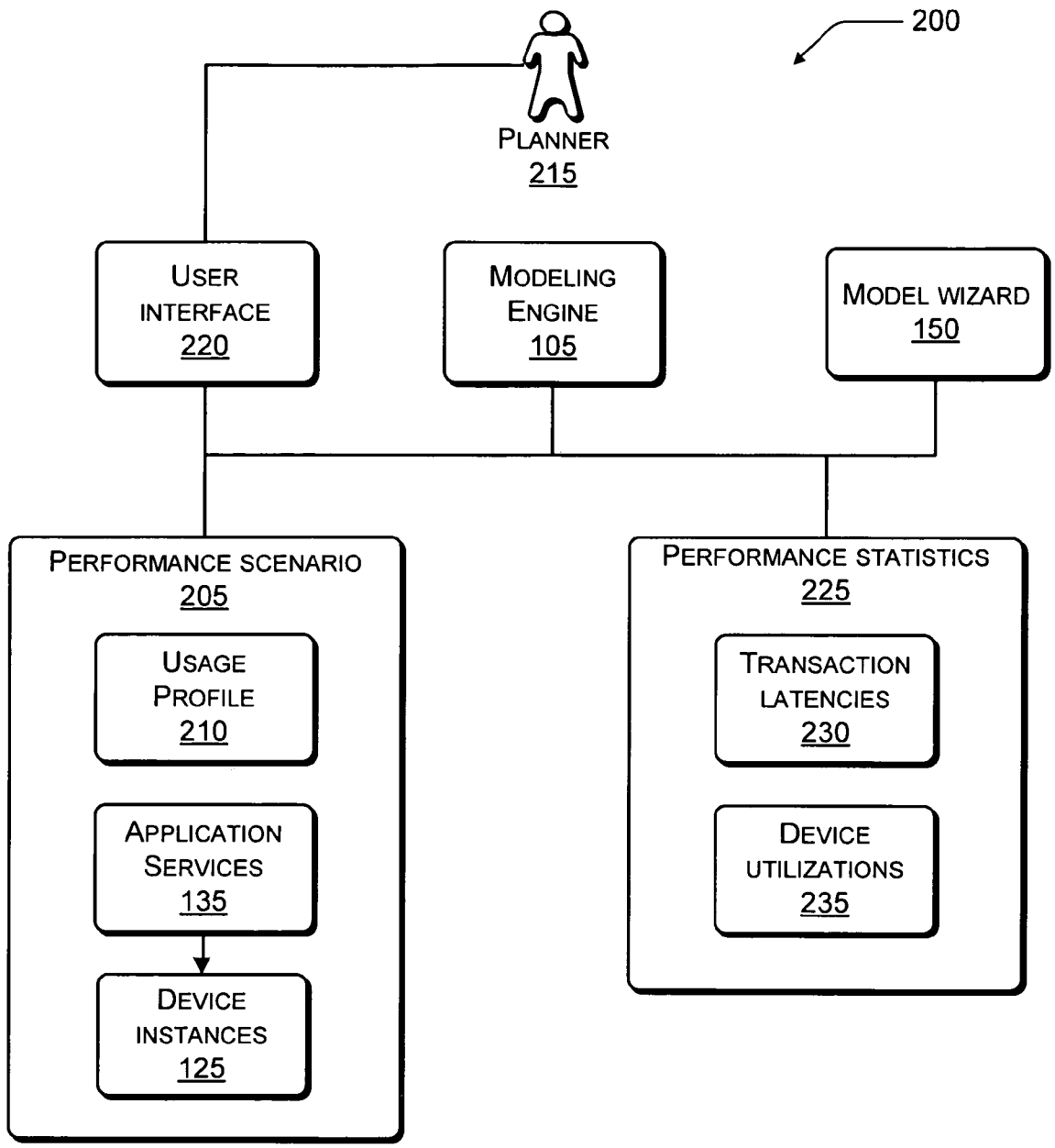
FIG. 2 is a block diagram of a state of the modeling system after creation of the performance scenario and after execution of the modeling engine that produces performance statistics for that performance scenario.

For clarity and convenience in illustration and description, FIGS. 1 and 2 depict several respective inputs to and outputs from the modeling engine 105 in block form. However, it is noted that these various inputs and outputs could readily be contained in one or more common data stores or data bases, with these one or more common data stores containing multiple respective instances of each parameter or statistic discussed herein, and with these parameters or statistics being indexed or otherwise organized for consistent access and retrieval. These comments apply equally to the various other parameters and statistics illustrated and described herein. Also, suitable hardware and software architectures for implementing the modeling engine 105 to achieve the methods taught herein are disclosed in FIG. 8 below.

The modeling engine 105 comprises combinations of hardware and software components implementing the methods taught herein. The modeling engine performs both simulation preconditioning and the stochastic simulation itself at different stages of the overall modeling process. The modeling engine 105 receives input from device models 110 and an application model 120. Each of these components 110 and 120 are now discussed in further detail.

The device model 110 is a data structure that describes how a given device 125 responds to workload demands assigned to it in a performance scenario. Suitable examples of the device 125 can include, for example, a processor, disk drive, network interface card, or the like. Additional examples of the device 125 can also include components of local or wide area networks, firewalls, encoders, accelerators, caches, or the like. In addition, the teachings herein may readily be extended to devices that are implemented in the future.

Respective devices 125 can have their own device models 130, or models for different devices 125 can be integrated into one device model 110, with parameters for each device 125 being indexed for subsequent access. The device model 110 for a given device 125 receives as input a description of a given transaction. This description is referred to as an action and specifies the workload demand for that device 125, such as the number of processor cycles executed to service the given transaction. It is noted that actions targeted to different types of devices 125 can carry different structures that represent the workload.

The device model 110 returns statistics such as the amount of time it takes to service the given action, or the amount of workload remaining after an interval of simulation clock time has elapsed. For example, a device model 110 for a given INTEL® processor might indicate that this processor would take a first number of cycles to perform a given task, while a device model 110 for a given AMD® processor might indicate that this processor would take a second number of cycles to perform the same task.

As an example of how a device model 110 can operate, if an e-mail user requests that an e-mail server open an e-mail message, this request is eventually routed to a processor within the e-mail server. The workload description of this request specifies the number of processor cycles that are processed to service the transaction. The device model 110 for this processor predicts the length of simulation clock time that must elapse to service this request. The prediction accounts for the presence of other concurrently executing compute actions. At a given instant of simulation clock time, each of the executing actions identifies the time remaining before all of its remaining workload (i.e., remaining processor cycles) are processed. A device state change occurs when the elapsed simulation clock time exceeds the time remaining to complete the processing of the action with the shortest time remaining. When a state change occurs, the workload remaining for the other actions is recalculated and their remaining time to completion is updated.

The device model 110 further enables the modeling engine 105 to consider the performance characteristics of the devices 125 involved in the deployment. Some customers, for example, may deploy software onto devices 125 in the form of legacy hardware, while other customers may deploy software onto devices 125 in the form of new, state-of-the-art hardware. Using the device models 110, the modeling engine 105 takes factors such as these into account.

The application model 120 is a data structure that describes the type of services 135 related to a given application, the transactions 140 that utilize the services 135, and the costs of each action 145 comprising the transactions 140. The action costs 145 specify the workload characteristics of each transaction 140 for each type of device 125. For example, the application model 120 can represent software such as the Microsoft Exchange™ e-mail application, which may be deployed across a given enterprise. These applications can be server-based, or can be standalone software. The software can also include operating system software, utilities, or middleware, or any combination of the foregoing.

The application model 120 can support various types of transactions 140, whose actions 145 can be mapped onto separate respective hardware or devices 125 for execution. One transaction 140 and one action 145 are shown in FIG. 1 for convenience and clarity, but not limitation. The teachings herein may be practiced with any number of transactions 140, actions 145, or devices 125, any combination thereof, and with any relationship therebetween.

The application model 120 also specifies the workflow of the transactions 140 between services 135. For example, consider an application that includes services 135 in the form of a web service and a database service. The workflow may specify that a client can generate a request and send it to a web service, and that the web service may then forward the request to a database service if the request cannot be fulfilled by the web service cache.

The model wizard 150 defines and refines performance scenarios, and is discussed further below in connection with FIGS. 2 and 3.

The modeling engine 105 receives as input a performance scenario from the model wizard, and computes device utilization and other performance statistics for the performance scenario. The modeling engine 105 is discussed in further detail in connection with FIGS. 2, 4, and 6.

FIG. 2 illustrates a state 200 of the modeling system after creation of a performance scenario 205 and after execution of the modeling engine 105 that produces performance statistics for that performance scenario 205. The performance scenario 205 is a data structure defined by the model wizard 150 and includes a usage profile 210, a set of application services 135, and device configuration instances 125. The performance scenario 205 specifies how many and what types of devices 125 are included in a proposed deployment. The performance scenario 205 also specifies the mapping of application services 135 to device configuration instances 125.

The usage profile 210 specifies parameter values of the proposed deployment. Assuming deployment of an e-mail application, for example, an illustrative usage profile 210 may specify parameter values such as how many users are in the enterprise supported by the e-mail application, how these users may be grouped into categories (if at all), how many e-mails are expected to be opened, sent, and/or received by the users, or the like. These various parameter values can be combined into the usage profile 210 for use later in modeling the deployment.

The usage profile 210 can indicate whether the software is to be deployed to a plurality of different offices or locations associated with a customer. If these different offices or locations will impose different transactional loads upon the devices 125, the usage profile 210 can reflect these circumstances. For example, one office may be smaller than another office, and accordingly may impose a lower processing burden on the devices 125 supporting that office. The usage profile 210 can also indicate how the hardware, software, and networks linking these different offices may impact the deployment of the software. The usage profile 210 is populated based on an interaction between the model wizard 150 and planners 215, as discussed in more detail below in connection with FIG. 3.

At different stages of its processing, the model wizard 150 outputs at least two different versions of the performance scenario 205. First, the model wizard 150 defines an initial performance scenario 205. If the initial performance scenario 205 is optimized or rationalized, then a final performance scenario 205 results from this optimization. The final performance scenario 205 is a data structure describing an optimized configuration of devices 125, and specifying how many and what types of devices 125 are included in this optimized configuration.

In a typical capacity planning scenario, technical sales persons, consultants, systems administrators, capacity planners, or the like (referred to generally herein as planners 215) may interact with the model wizard 150 through a user interface 220. The planners 215 design deployments of software represented by the application model 120 shown in FIG. 1.

Planners 215 are generally tasked with determining how many and what type of devices 125 are deployed. As an example illustrating different types of devices 125, planners 215 designing a deployment of the application model 120 may determine how many processors are needed, the performance characteristics of the processors, how many and what type of storage devices are included, how many and what type of network devices are included, or the like. If the application model 120 includes different subcomponents that are deployed onto different hardware platforms, then the planners 215 may address similar issues to determine the particular devices 125 that would comprise these platforms.

In the process of determining whether the performance scenario 205 should be optimized, the modeling engine 105 computes a set of performance statistics 225 for the performance scenario 205. These performance statistics 225 can include various aspects of transaction latency 230 and various aspects of device utilization 235.

The action latency 230 refers to how long it takes the given device 125 (e.g., the processor in the e-mail server example above) to service a transaction 145, and is expressed in units of time. For example, returning to the e-mail example from above, the action latency 230 could indicate how long it takes a particular processor or disk or some other device to process a request from a user to open an e-mail, to send an e-mail, or the like.

The device utilization 235 indicates the level of usage each device 125 will experience when executing the transaction load specified for that device 125 by the usage profile 210. The device utilization 235 is expressed as a percentage of the capacity of the device 125. For example, a device utilization 240 of 100% means that the device 125 is being used to the utmost of its capacity, while a device utilization 235 of 50% means that the device 125 is being used at approximately half of its capacity, and so on. As discussed in further detail below, a device utilization 235 for a device 125 as computed herein can exceed 100%. This level of utilization may indicate to the planners 215 and/or the model wizard 150 that the performance scenario 205 needs to be rationalized by adding more devices 125, by substituting different types of devices 125, or by rearranging the workload across the devices 125.

Stated broadly, outputs from the modeling engine 105 for a given performance scenario 205 include transaction latencies 230 and device utilizations 235. These two outputs are related, in that if the device utilization 235 for a given device 125 is high, then the transaction latency 230 for this device 125 would correspondingly increase. Conversely, if the device utilization 235 for the device 125 drops, then the transaction latency 230 of the device 125 would correspondingly decrease. As discussed above, deployments are generally constrained by upper and/or lower bounds on transaction latency 230 and/or device utilization 235. The modeling engine 105 enables the planners 215 to perform one or more "virtual experiments" to determine rational performance scenarios 205 that enable the deployment as a whole to perform according to these constraints.

To achieve an optimum deployment of the software as represented by the application model 120, the planners 215 use the modeling engine 105 and the model wizard 150 to select and configure the devices 125 to satisfy performance constraints. Such constraints may place upper and lower bounds on device utilization 235 or upper bounds on transaction latency 230. These constraints may also include factors unrelated to performance, such as architecture constraints specific for the applications being deployed, and so on. If the devices 125 are under-provisioned, then the device utilization 235 and the transaction latency 230 may be unacceptably high. Conversely, if the devices 125 are over-provisioned, then deployment costs may be unnecessarily high.

The model wizard 150 and the modeling engine 105 model how the performance scenario 205 would operate in a real-world deployment, and analyzes performance statistics 225 such as the device utilization 235 and the transaction latency 230 associated with the performance scenario 205. In response to this analysis, the planner 215 or model wizard 150 can adjust the number or type of devices 125 included in the performance scenario 205, and can also adjust the mapping of application services 135 to devices 125 in order to define a final performance scenario 205 that achieves acceptable levels of device utilization 235.

If the model wizard 150 and modeling engine 105 are used before actual deployment of the software on a customer site, the model wizard 150 and modeling engine 105 can prevent resources from being wasted on deploying hardware or other devices that do not enable the deployed software to perform to customer specifications. The model wizard 150 and modeling engine 105 enable modeling and adjustment of a virtual deployment simulated on a computer, which is far cheaper than modifying a live system already deployed on a customer site.

Using the model wizard 150 and modeling engine 105 to analyze the deployment by modeling can also reduce costs borne by a vendor and/or a customer later in supporting the software and/or devices 125. Software that is deployed in an improper hardware environment may not perform to specifications. This software and/or the devices 125 may thus need expensive post-deployment corrections. However, if the initial deployment is close to optimal, these post-deployment support costs may be significantly reduced or eliminated, leading to greater customer satisfaction and lower overall deployment cost.

The model wizard 150 defines the usage profile 210 and deployment characteristics relevant to a given deployment of the software. The software can be deployed in the context of, for example, a client-server system. The deployment characteristics can include information about the topology of the client-server system, the software components included in the client-server system, and the type and quantity of devices 125 in the client-server system.

As discussed in the Background, specification of a satisfactory performance scenario using conventional modeling techniques can be a lengthy, cumbersome, and complex process for the planners 215, and can involve the planners 215 having some degree of technical sophistication. The teachings herein reduce the length of the overall modeling process by providing a preconditioning technique for the modeling engine 105. The model wizard 150 obtains input from the planners 215 that is more limited and less detailed than that used by conventional modeling techniques, and automates specification of an initial performance scenario 205 that incorporates best practices for the deployment of the software. The preconditioning technique and related modeling process are discussed in connection with FIG. 3.

Overall Modeling Process

Figure 3:
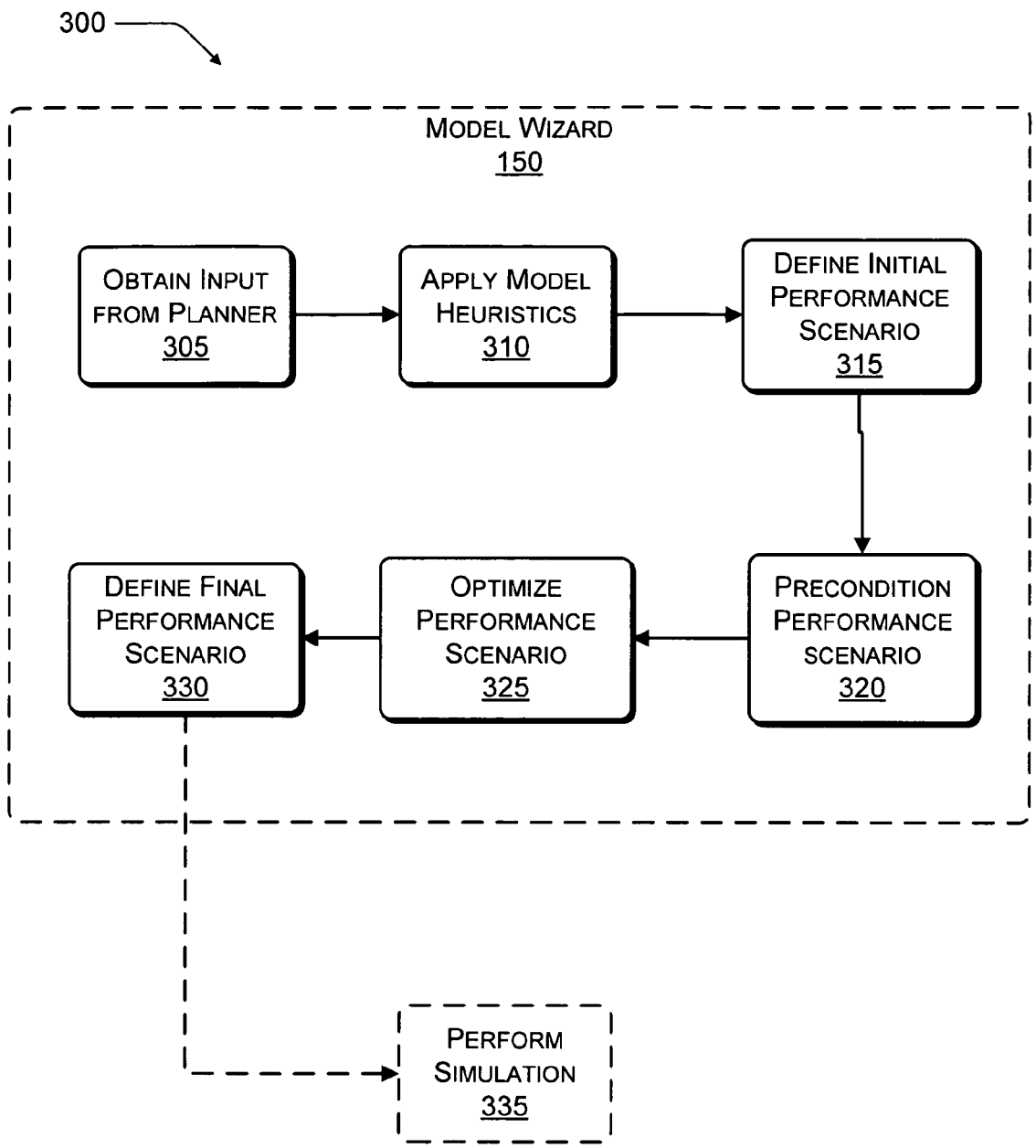
FIG. 3 is a flowchart of a process performed by a model wizard shown in FIG. 2.

FIG. 3 illustrates a process 300 performed by the model wizard 150 shown in FIG. 2. The model wizard 150 includes the blocks 305, 310, 315, 320, 325, and 330 shown in FIG. 3. Block 320 includes a preconditioning process provided by the modeling engine 105 for use by the model wizard 150. Block 335 represents a simulation process provided by the modeling engine 105, but not provided by the model wizard 150.

Obtain Input from Planner

In block 305, the model wizard 150 obtains input from the planner 215, and enables the planner 215 to describe the deployment and client profile at a relatively high level. The model wizard 150 obtains this input from the planner 215 by conducting a dialog in which the planner 215 answers a set of questions that do not involve a high degree of technical expertise or sophistication. For example, the model wizard 150 may prompt the planner 215 for high-level data related to the deployment, such as the number of offices in the organization, the number of users in each office, the general industry in which the enterprise is engaged, or the like. In contrast, conventional modeling techniques may involve the planner 215 providing detailed knowledge of usage profiles, technical properties of devices, details of network topology, or the like.

Apply Model Heuristics

In block 310, the responses from the planner 215 are collected by the model wizard 150 and passed to a process that employs, for example, heuristic techniques to expand these responses into a more detailed client or usage profile 210. The modeling engine 105 references this usage profile 210 in later stages of the modeling process. Conventional modeling techniques typically involve the planner 215 providing this type of detailed deployment information directly, but the model wizard 150 compiles this information automatically based on the planner's responses to the relatively high-level questions posed in block 305 above.

For example, assume that the planners 215 are designing the deployment of an e-mail application to a law firm having approximately 500 employees. In block 305, the model wizard 150 would obtain input from the planners 215 as discussed above, and in block 310, the model wizard 150 applies heuristic techniques to this input to estimate or project what types of transactions 140 might be expected in this law firm deployment. For example, these types of transactions 140 might include opening e-mails, sending e-mails, maintaining mailboxes, deleting e-mails, or the like. The model wizard 150 may also employ the heuristic techniques to estimate how many of these transactions 140 are expected to occur per unit time, and otherwise define a detailed usage profile 210 that describes the deployment that is to be simulated or modeled. The heuristic techniques can perform the above estimates using, for example, e-mail usage characteristics exhibited by organizations of similar size, whether law firms or not.

Define Initial Performance Scenario

In block 315, the model wizard 150 analyzes the input from the planner 215 and applies heuristics to determine enough details about the deployment and usage profile 210 so that the initial performance scenario 205 can be defined or specified. As discussed above, the initial performance scenario 205 is a data structure that instantiates instances of device configurations 125 for a given deployment, maps application services 135 to device configurations 125, and specifies the usage profile 210. As such, this data structure may contain parameters defined using techniques such as those discussed above in the law firm deployment example.

The initial performance scenario 205 specifies a performance scenario 205 that can be simulated and analyzed. In later phases of the modeling process, the model wizard 150 accounts for the workload demands of the application so that the device utilizations 235 of the performance scenario 205 are within acceptable bounds. However, the initial performance scenario 205 is sufficient to begin the modeling process 300. Thus, these aspects of the process 300 help to minimize repetitions of the modeling process 300 performed before arriving at a final performance scenario 205.

Precondition Performance Scenario

In block 320, the process 300 preconditions the initial performance scenario 205 as received as input from block 315. The initial performance scenario 205 specifies a given configuration of devices 125. For each device 125 included in the initial performance scenario 205, the modeling engine 105 estimates the device utilization 235 that each device 125 would experience under the transactional workload specified by the initial performance scenario 205. The simulation preconditioning process 320 is discussed in further detail below.

Optimize Performance Scenario

In block 325, the model wizard 150 analyzes the device utilization 235 obtained from block 320 to determine the optimal quantity and type of devices 125 to support the workload demands of the deployment. For example, the simulation preconditioning process 320 may indicate that a given device 125 included in an initial performance scenario 205 would operate at a device utilization 235 of 560% in the proposed deployment. This device utilization 235 indicates to the optimization process 325 not only to add devices 125, but also suggests adding approximately six devices 125. Thus, the model wizard 150 and/or the planners 215 using the model wizard 150 need not blindly guess at the optimal number of additional devices 125, as with conventional modeling techniques. Generally, stochastic simulation does not calculate or provide device utilization statistics indicating a device utilization level exceeding 100%, but only indicate a maximum utilization level of 100%. Thus the planners 215, if using conventional techniques, may know only that the devices 125 are fully loaded, but may not know exactly how overloaded the devices 125 are.

In this manner, the simulation preconditioning process 320 enables a relatively rapid optimization of the number and types of various devices 125 that are deployed in a given performance scenario 205. This optimization is rapidly achieved, at least in part, by computing the device utilization 235 of these various devices 125 without needing to perform stochastic simulation 335 based on repeated processing of transactions and analysis of performance statistics. Also, in some embodiments, the transaction latency 230 can be considered apart from, or in connection with, the device utilization 235.

In one embodiment of the teachings herein (i.e., the workload aggregation technique), the mapping of the application services 135 to the devices 125 may be modified with no significant increase in the preconditioning time. A modification in the service mapping is useful it helps achieve additional optimization objectives such as consolidation of services onto a single computer.

In some cases, the model wizard 150 may perform preconditioning 320 repeatedly if its analysis of device utilization 235 indicates that certain modifications in the performance scenario 205 should be made. Such modifications can include changes in device configurations 125 or changes in the mapping of services 135 to devices configurations.

Define Final Performance Scenario

In block 330, the model wizard 150 constructs a final performance scenario 205 and presents it to the planners 215. The final performance scenario 205 is similar to the initial performance scenario 205, but the final performance scenario 205 quantifies the devices 125 recommended for the deployment and then finalizes the mapping of services to devices. Further, the final performance scenario 205 takes into account the transactional workload supported by the devices 125, as enabled by the analysis performed by the simulation preconditioning process 320.

Perform simulation

Given the final performance scenario 205 as constructed by the model wizard 150, the planners 215 may decide to stop the overall modeling process 300 and not run an actual stochastic simulation on the final performance scenario 205. However, should the planners 215 choose, the final performance scenario 205 can be simulated by the modeling engine 105 to more accurately estimate the device utilization 235 and the transaction latency 230. This simulation process is represented generally by block 335. The optional status of this final simulation process 335 is indicated by the dashed outlines shown in FIG. 3.

Implications on Modeling Time

Turning to the simulation preconditioning process 320 in more detail, this process 320 accelerates the overall modeling process 300 by reducing the time it takes the planners 215 to define a final performance scenario 205 that is reasonably close to a valid, workable scenario, rather than guessing or intuiting the initial performance scenario 205 or final performance scenario 205 as with conventional modeling techniques. Typically, the time to perform the preconditioning process 320 is O(1) second or less on a contemporary computer such as a computer configured with a single INTEL® Pentium 4 processor and 1 GB of RAM. In contrast, the time to perform a single stochastic simulation 335 is typically O(10)-O(100) seconds. Thus, it is much cheaper to perform the simulation preconditioning process 320, even repeatedly, than it is to perform one pass of the simulation 335.

Methods for Preconditioning the Performance Scenario

The teachings herein provide two complementary methods for preconditioning the initial performance scenario 205, as represented by block 320 of FIG. 3, and as performed by the modeling engine 105 shown in FIGS. 1 and 2. These preconditioning methods compute device utilization statistics without having to do a full-blown simulation 335, and enable estimation of the optimal quantity and type of devices 125 to be included in the final performance scenario 205. These two methods are labeled "pseudo-simulation" and "workload aggregation", and are discussed separately below.

Pseudo-Simulation

Figure 4:
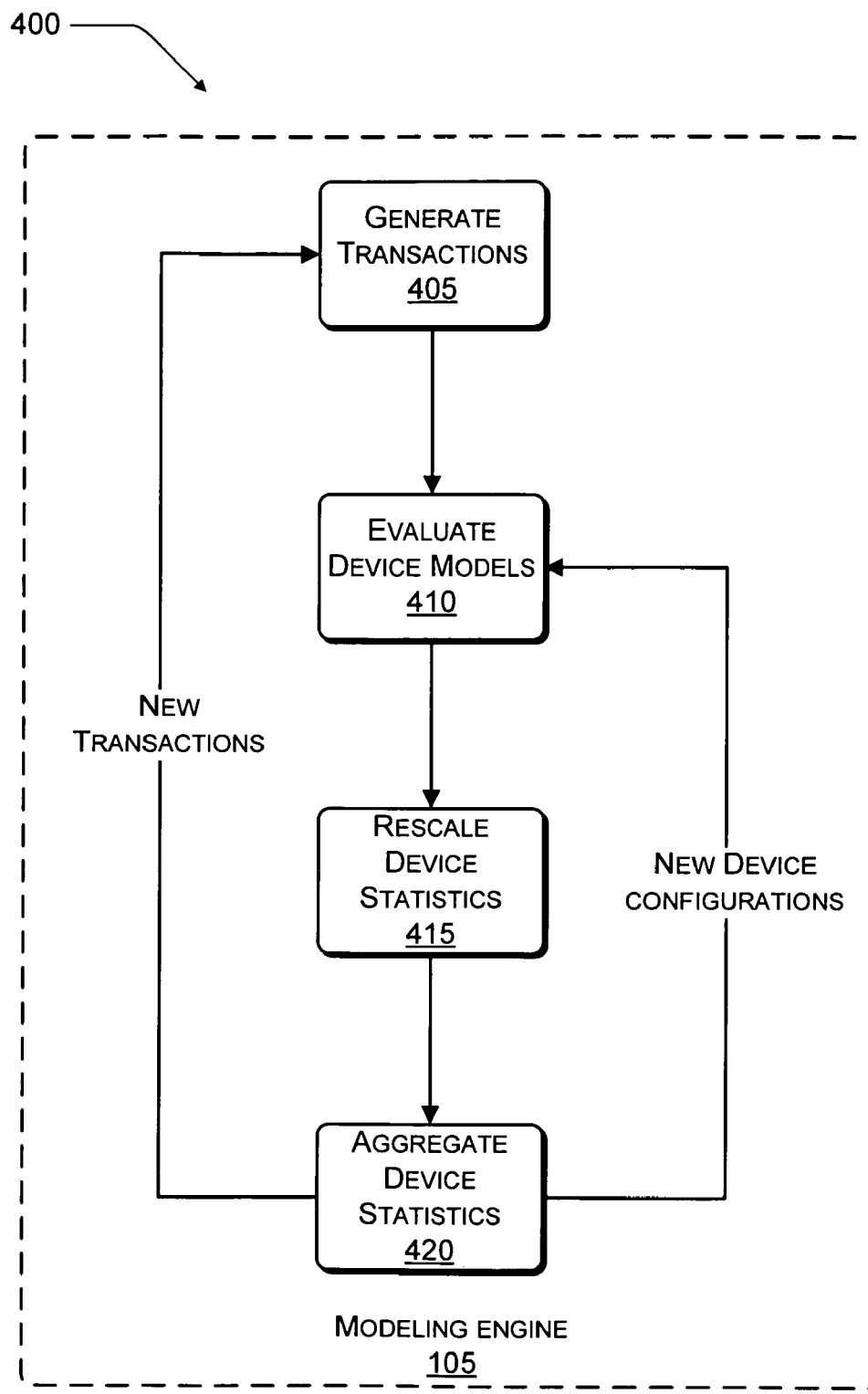
FIG. 4 is a flowchart of a pseudo-simulation process performed by the modeling engine shown in FIGS. 1 and 2.
Figure 5:
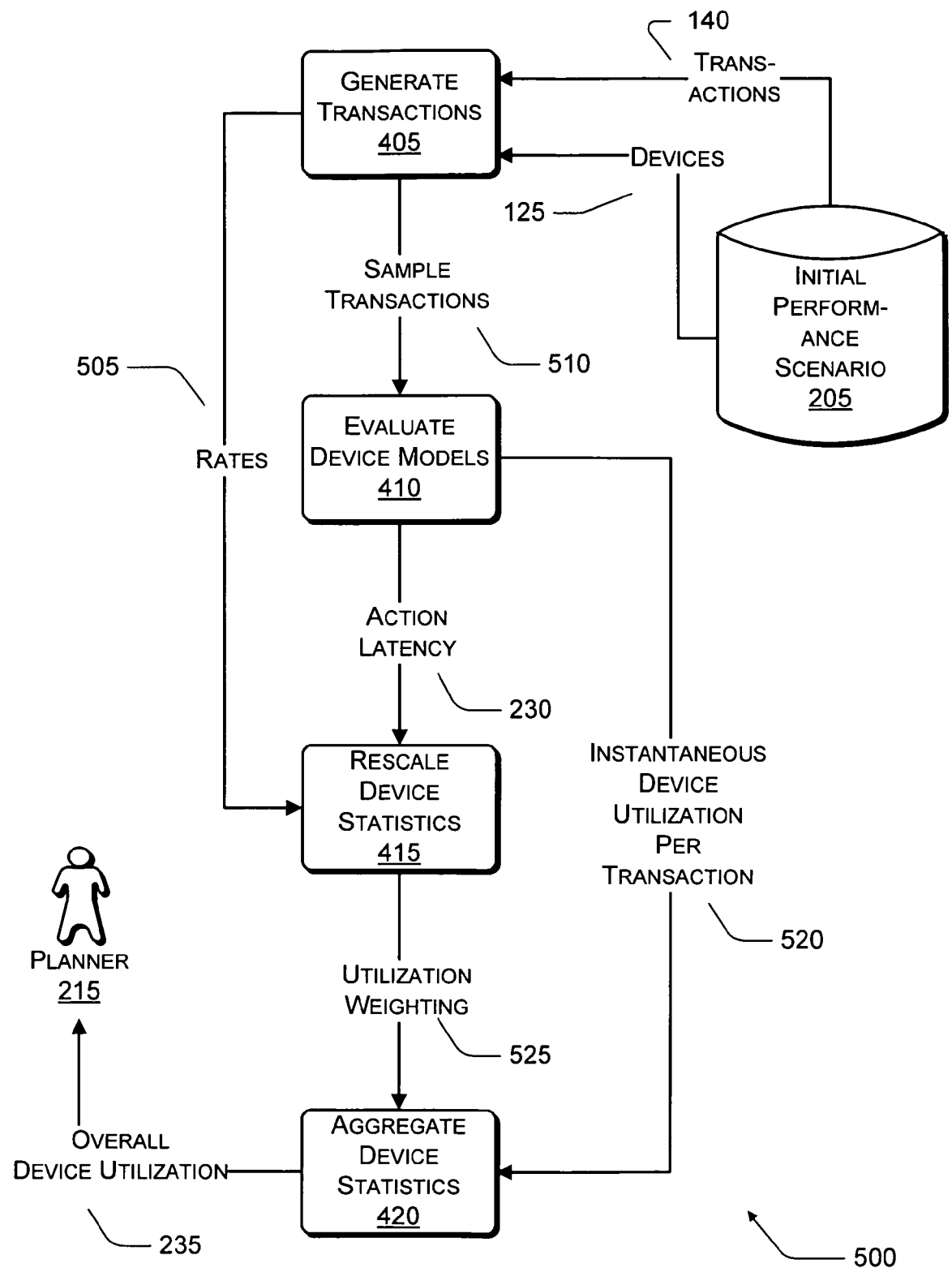
FIG. 5 is a data flow diagram of the pseudo-simulation process shown in FIG. 4.

FIG. 4 illustrates the pseudo-simulation process 400 performed by the modeling engine 105 shown in FIGS. 1 and 2. FIG. 5 illustrates data flows 500 associated with the pseudo-simulation process 400 shown in FIG. 4. The same process blocks 405, 410, 415, and 420 appear in both FIGS. 4 and 5. However, given the slightly different contexts represented by FIGS. 4 and 5, these reference numbers may be designated as "blocks" in the context of FIG. 4 and as "processes" in the context of FIG. 5.

For each device 125 in the initial performance scenario 205, the pseudo-simulation process 400 performs the following.

1. Generate Transactions

In block 405, as part of the pseudo-simulation process 400, the rate of occurrence 505 for each type of transaction 140 in the deployment is calculated. These transactions 140 and corresponding rates of occurrence 505 help to define the transaction workload to which the devices 125 included in the initial performance scenario 205 will be subjected.

If the software is being deployed to a customer enterprise that includes a plurality of different sites, offices or locations, and these offices or locations exhibit different usage profiles 210, then the transaction loads experienced by devices 125 deployed at the different sites may differ. If this is the case, the process 405 may generate different sample transactions 510 and rates of occurrence 505 as appropriate to model each site to which the software is to be deployed.

Continuing with the law firm example from above, assume the firm has offices in New York and Los Angeles, and that the e-mail application being deployed supports two transactions 140: open e-mail, and send e-mail. In this example, block 405 of the pseudo-simulation process 400 would generate at least two sample transactions 510 for each office, an open e-mail transaction and a send e-mail transaction. If the office in New York is substantially smaller than the Los Angeles office, the transactional workload experienced at the New York office may be proportionately lighter and this could be reflected in the sample transactions 510 and the rates of occurrence 505 as output from block 405.

As another example, consider an e-commerce application that enables a shopper to perform "browse" and "purchase" transactions 140. Assume that a large number of e-commerce customers may simultaneously perform these transactions 140, resulting in 200 "browse" transactions per second and 100 "purchase" transactions per second. The sample transactions 510 output from block 405 would include the browse and purchase transactions, with corresponding rates of occurrence 505 defined for each.

Generation of transactions 510 for each combination of transaction type, office, and other parameters that define the transaction source is repeated N times, where N is an integer representing a sample size parameter. N is chosen sufficiently large so that any branches in the workflow or other random aspects of the transactions 140 are exercised with statistical significance. In another embodiment, N may be different for different transaction types since these may exhibit different workflow branches. This sample size parameter N is typically orders of magnitude smaller than the number of samples of the transactions 140 that would ordinarily be generated during the course of a stochastic simulation 335. Stochastic simulation 335 typically involves an iterative process in which a given transaction is repeatedly evaluated by the modeling engine until enough data is gathered to judge the simulation statistically relevant, which can be a time consuming process.

Thus, in the above e-commerce example, the pseudo-simulation process 400 might be run twice, once for the browse transaction 140 and once for the purchase transaction 140. Likewise, in the e-mail example, the pseudo-simulation process 400 might be run once for the open e-mail transaction and once for the send e-mail transaction. As discussed above, additional sample transactions 510 may be generated and simulated to account for different usage profiles 210 and service mappings 135 prevailing at different sites.

2. Evaluate Device Models for each Generated Transaction

For each combination of transaction type, office, and other parameters that define a transaction source, the device models 110 are invoked to calculate performance statistics 225, which include the action latency 230 and the instantaneous device utilization 520 of device instances 125 specified in the initial performance scenario 205. Note that these performance statistics 225 do not reflect the overall workload demands of the application. Subsequent steps of the pseudo-simulation process 400 account for such workload demands. Also, the processes shown in blocks 405 and 410 can be repeated for N samples of the respective generated transactions 510.

Applying the above to the e-commerce example discussed herein, assume that a relatively slow processor is running the e-commerce application. Assume further that the device models 110 for this slow processor show that the compute action latency 230 of a browse transaction is 10 milliseconds and that the compute action latency 230 of a purchase transaction is 15 milliseconds. Also assume that the device models 110 for the slow processor show an instantaneous device utilization 520 for this processor at 100% when executing a browse transaction, and at 80% for a purchase transaction. Finally, suppose that N is chosen as 2, so that the processes 405 and 410 are each repeated twice for each transaction type 140 for a total of four times. The N determinations of the action latency 230 for each transaction type 140 resulting from these repetitions are sent to block 415, and the N determinations of the instantaneous device utilization 520 for each transaction type 140 are sent to block 420 for further analysis.

3. Rescale Device Statistics

In block 415, the pseudo-simulation process 400 computes a statistic used to weight the per-transaction device utilization level 520, which indicates the level of device utilization contributed by each type of transaction 140 being executed on a given device 125. This statistic is a unitless quantity, and is referred to here in as a "utilization weighting" statistic 525. For each device 125 included in the performance scenario 205, this utilization weighting statistic 525 effectively rescales the action latency 230 for the device 125 to account for the latency attributed to each type of transaction 140, relative to all the other transactions 140 executing on the device 125. More particularly, for each device 125 in the performance scenario 205, the action latency 230 of each type of transaction 140 executed on the device 125 is averaged over the N samples. This action latency 230 is then scaled or weighted by the rate or frequency at which each type of transaction 140 is expected to occur, relative to the other transactions 140 executed on the device 125. This scaling process 415 thus relates the action latency 230 contributed by each type of transaction 140 to the action latency 230 contributed by all other types of transactions 140.

The utilization weighting statistic 525 (UW) is computed using Equation 1.0 below, and equals the rate of occurrence 505 (Rate) for the given type of transaction 140 multiplied by the average action latency 230 (TL) Equation 1.0 follows:

$$UW = \text{Rate} * \frac{1}{N} * \sum_{i=1}^{N} TL_i$$

This utilization weighting is calculated for each device instance and each transaction type in the performance scenario 205. Therefore, in general, this quantity will be calculated for processor, disk, and communication devices for each transaction type.

Applying the process 415 to the e-commerce example, recall that the browse transactions 140 are assumed to occur at the rate of 200 transactions per second and that purchase transactions 140 are assumed to occur at the rate of 100 transactions per second. Therefore, to obtain the processor utilization weighting statistic 525 (UW) for the browse transactions 140, the process 415 multiplies the rate of occurrence 505 (Rate) at which browse transactions 140 occur (200 transactions per second) by the average compute latency 230 (TL) of the browse transaction (10 milliseconds per compute action). The average compute latency 230 is determined as the sum of compute action latencies (10 milliseconds+10 milliseconds) divided by the integer N, which was chosen above as 2. Inserting these variables into Equation 1.0 yields a utilization weighting statistic 525 (UW) for the browse transactions of 2.0, as shown here:

$$UW = \text{Rate} * \frac{1}{N} * \sum_{i=1}^{N} TL_i$$

$UW = (200 \text{ transactions/s}) * (10 \text{ ms/compute\_action}) * (s/1000 \text{ ms})$ $UW = 2.0$ Similarly, the purchase transactions were assumed above to have an action latency 230 (TL) of 15 milliseconds per transaction and a rate of occurrence 505 (Rate) of 100 transactions per second. Inserting these variables into Equation 1.0 yields a processor utilization weighting statistic 525 (UW) for the purchase transactions of 1.5, as follows:

$$UW = \text{Rate} * \frac{1}{N} * \sum_{i=1}^{N} TL_i$$

$UW = (100 \text{ transactions/s}) * (15 \text{ ms/compute\_action}) * (s/1000 \text{ ms})$ $UW = 1.5$ The utilization weighting statistics 525 for each of these transaction types 140 is used by block 420 to perform the calculations below.

4. Aggregate Statistics Representing Device Utilization

In block 420, for each device 125 included in the initial performance scenario 205, the pseudo-simulation process 400 computes the overall device utilization 235, represented by the variable (ODU). The device utilization 235 represents how heavily loaded the given device 125 is, and accounts for the load of all transactions 145 mapped to that given device 125. In contrast, the instantaneous device utilization 520 represents the utilization resulting from a single action 145, and does not account for the frequency of the transaction 140 to which a given action 145 belongs. The instantaneous device utilization level 520 contributed by each action 145 is represented by the variable (DU).

In block 420, the pseudo-simulation process 400 combines or aggregates each of these individual instantaneous device utilization levels 520 (DU) into a respective overall device utilization 235 (ODU) for the device 125. Note that the action latency 230 (TL) and rate of occurrence 505 (Rate) were accounted for above by block 415 when computing the utilization weighting statistic 525 (UW) for each device 125. Note further that the overall device utilization 235 (ODU) can exceed unity, as shown by the example below.

The process 420 performs this aggregation by multiplying the utilization weighting statistic 525 (UW) defined for each type of transaction 140 mapped to the device 125 by the instantaneous device utilization level 520 (DU) experienced by the device 125 when executing that transaction 140. The process 420 then sums these products for each type of transaction 140 executed on the device 125. Equation 2.0 below represents the calculation of the overall device utilization 235 (ODU) of a given device 125, where j represents the number of different types of transactions 140 mapped to the given device 125:

$$ODU = \sum_{i=1}^{j} UWi * DUi$$

Returning to the e-commerce example, the utilization weighting statistics 525 (UWs) for the browse and purchase transactions 140 were computed above to be 2.0 and 1.5, respectively. Recall that the instantaneous device utilization levels 520 (DUs) for the device 125 in the form of the "slow" processor were assumed to be 100% for the browse transaction 140 and 80% for the purchase transaction 140. Since this example includes two transactions 140 (browse and purchase), j=2 in Equation 2.0 above. Proceeding with the summation:

ODU=2.0*100%+1.5*80%=320%

Notice that in this example, the overall device utilization 235 of the slow processor exceeds 100% when executing both the purchase actions 135 and the browse actions 135. Therefore, this result indicates to the model wizard 150 that the web service, which comprises browse and purchase transactions 140, should be mapped to a computer having at least four devices 125 of the type modeled above. This mapping should optimally support the workload demand represented by the browse and purchase transactions 140. More particularly, given an overall device utilization 235 of 320%, the modeling engine 105 would round this percentage up to the nearest hundred (400%), then divide by 100 to arrive at an estimate of four devices 125.

Note that if the device 125 in the form of the "slow" processor is replaced by a device 125 in the form of the "fast" processor (i.e., the web service 135 is remapped to a new device 125), then blocks 405 through 420 may be repeated to estimate the device utilization 235 of the "fast" processor. If only the device 125 is being changed, and the transactions 140 are not, then blocks 410 through 420 are repeated.

In general, if the device 125 is changed, the pseudo-simulation process 400 is repeated with the new device 125. However, the planner 215 and/or the modeling engine 105 may wish to repeatedly change devices 125 to optimize the initial performance scenario 205. Thus, the teachings herein also provide a complementary process that offers benefits in situations where devices 125 are changed as part of the preconditioning phase of a modeling process 300. In such situations, the alternative process, referred to herein as workload aggregation, reduces the time of the preconditioning phase 320 of the modeling process 300.

Workload Aggregation

Figure 6:
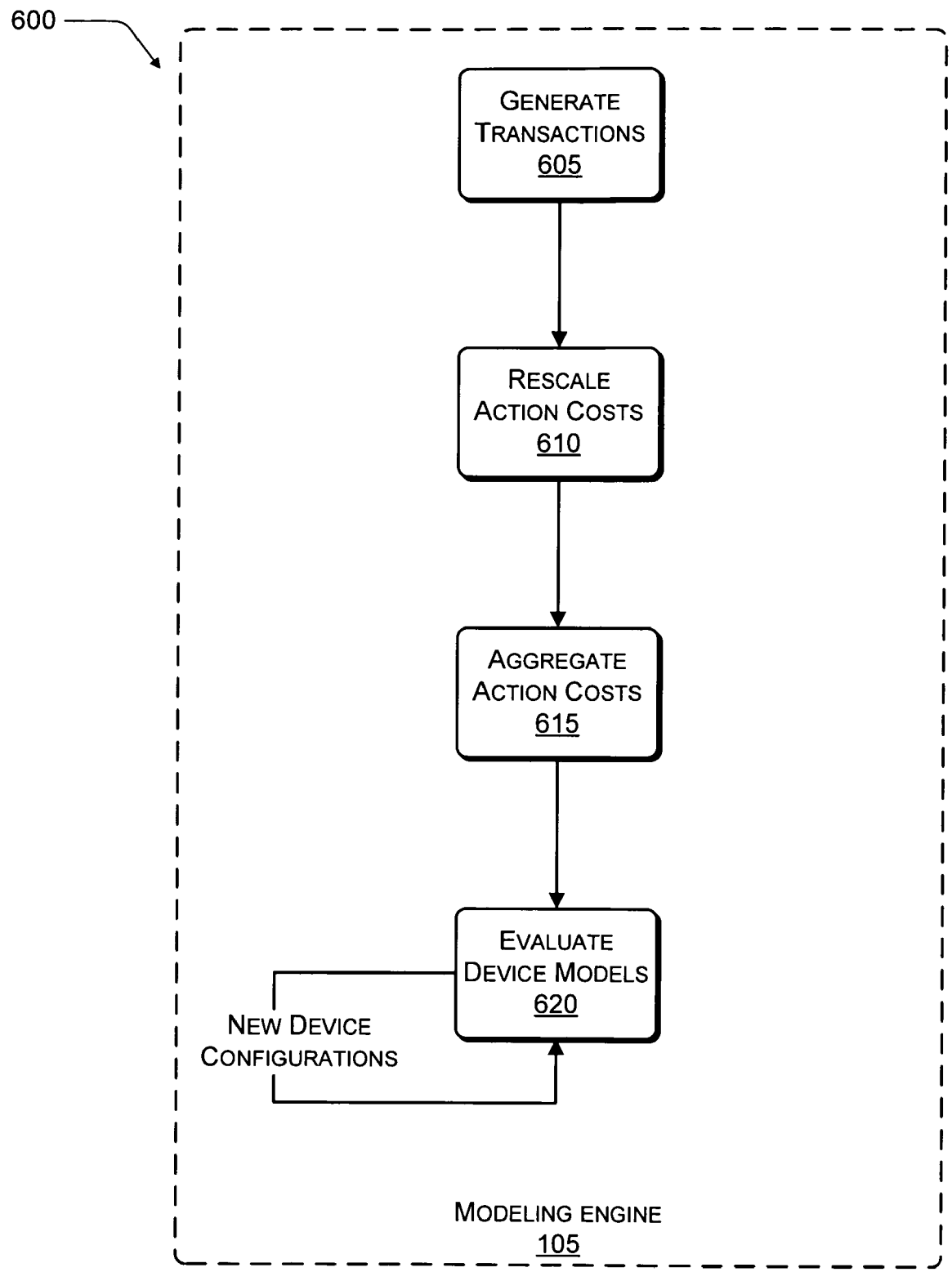
FIG. 6 is a flowchart of a workload aggregation process performed by the modeling engine shown in FIGS. 1 and 2.
Figure 7:
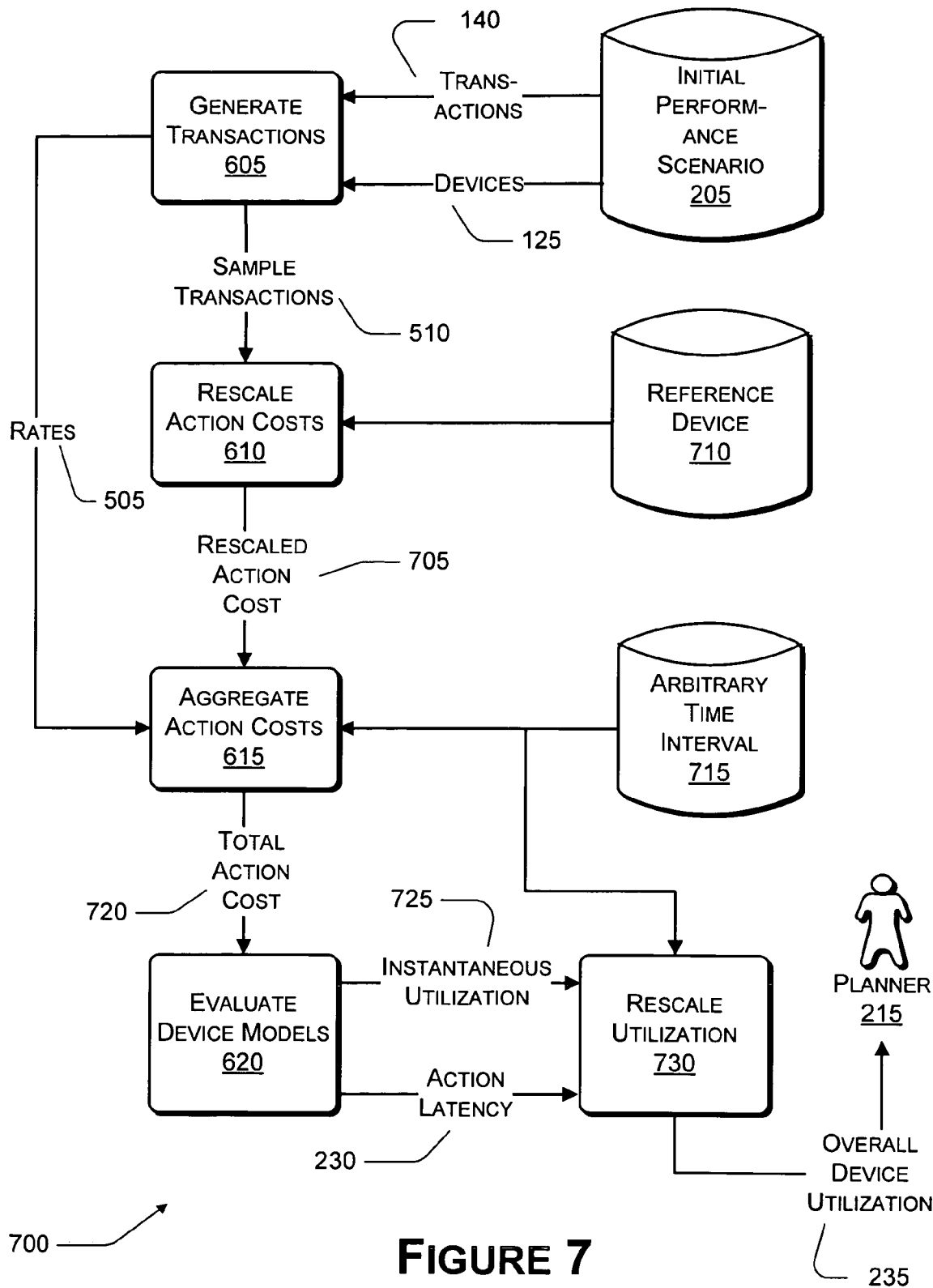
FIG. 7 is a data flow diagram of the workload aggregation process shown in FIG. 6.

FIG. 6 illustrates a workload aggregation process 600 performed by the modeling engine 105 shown in FIGS. 1 and 2. FIG. 7 illustrates a data flow 700 related to the workload aggregation process 600 shown in FIG. 6. Similarly to FIGS. 4 and 5 discussed previously, the same process blocks 605, 610, 615, and 620 appear in both FIGS. 6 and 7. However, given the slightly different contexts represented by FIGS. 6 and 7, these reference numbers may be designated as "blocks" in the context of FIG. 6 and as "processes" in the context of FIG. 7.

Broadly speaking, the workload aggregation process 600 takes into account the frequencies at which transactions 120 occur on a device 125 before applying a model 110 of the device 125 to these transactions 140. In contrast, the pseudo-simulation process 400 applies the device model 110 to the transactions 140 earlier in the overall preconditioning process. For each device 125 included in the initial performance scenario 205, the workload aggregation process 600 performs the following.

1. Generate Transactions

In block 605, as part of the workload aggregation process 600, the rate of occurrence 505 for each type of transaction 140 is calculated. As above with the pseudo-simulation process 400, these transactions 140 and corresponding rates of occurrence 505 help to define the transaction workload to which the devices 125 included in the initial performance scenario 205 are subjected. The rate of occurrence 505 is forwarded to process 615, discussed in detail below.

The process 605 generates N transaction samples 510 for each type of transaction 140, and also outputs data representing a rate of occurrence 505 for these sample transactions 510. The factors relating to defining the N transaction samples 510 are the same here as with the pseudo-simulation process 400.

As discussed above, if the software is being deployed to multiple customer sites, locations, or offices, and if these different customer sites exhibit different usage profile 210, transaction loads, or the like, then different sample transactions 510 can be generated for each of these different sites and different types of users in the sites. Returning to the law firm e-mail deployment example from above, if the New York and Los Angeles offices exhibit different usage profiles 210, then the process 605 can generate different sample open-mail and send-mail transactions 510 for the New York and Los Angeles offices, with different rates of occurrence 505. In any event, the criteria for choosing N is the same as discussed above in the pseudo-simulation process 400 shown in FIG. 4 above.

To demonstrate this phase of the workload aggregation process 600, we return to the e-commerce example discussed above. Here, we choose N=2 so that the browse and purchase transactions 510 are each sampled twice. Browse transactions 510 are assumed to occur at a rate of 200 transactions per second, and purchase transactions 510 are assumed to occur at a rate of 100 transactions per second. We also assume that the software is being deployed to only one customer site, or to multiple sites having similar usage profiles 210 that can be modeled concurrently. We will return to this example as we discuss the remaining phases of the workload aggregation process below.

2. Scale Action Costs

As discussed above in connection with the pseudo-simulation process 400, different types of transactions 140 may be mapped to a given device 125 in the form of a processor, disk, network link, or other component.

In block 610, herein, the term "workload description" for a given transaction 140 specifies an action cost of performing the given transaction 140 on a given device 125. However, in the case of a processor device the specification of workload descriptions can become complicated by at least two different situations.

First, different processor devices 125 from different manufacturers, or even different types of devices 125 provided by a given manufacturer, typically bear different action costs when performing a given transaction 140. In short, this observation may be characterized as a "same transaction on different processors" scenario. More particularly, a processor A may bear an action cost M in performing a given transaction X, while processor B may bear an action cost N in performing that same transaction X. However, if the initial performance scenario 205 specifies that processor B is executing transaction X, but the only available workload description for transaction X specifies processor A, then the process 610 scales, converts, or otherwise normalizes the workload description specified in terms of processor A into an equivalent workload description specified in terms of processor B.

Second, in light of the previous discussion, these different devices 125 will typically bear different action costs in executing different transactions 140. In short, this observation may be characterized as a "different transactions on different processors" scenario. More particularly, processor A may bear an action cost X in performing a given transaction M, while processor B may bear an action cost Y in performing a different given transaction N. To illustrate complications resulting from this scenario, assume that initial performance scenario 205 specifies a device 125 in the form of processor A, to which different transactions M and N are mapped. Assume further that the workload description for the transaction M is specified in terms of processor A, but that the workload description for the transaction N is specified in terms of processor B. Thus, the workload description for the transactions M and N are not specified on an "apples to apples" basis and cannot be aggregated without further analysis. To aggregate the action costs of transactions M and N when executed on the processor A, the process 610 scales, converts, or normalizes the action cost Y specified for processor B into an equivalent action cost that would be borne by processor A when executing the same transaction.

Extending these teachings, the workload aggregation process 600 may model an initial performance scenario 205 in which the above transactions M and N are mapped to a third processor C, with the workload description being specified in terms of either processor A or processor B. In this case, the process 610 scales, converts, or normalizes the action cost that would be borne by processor A or processor B into an equivalent action cost that would be borne by processor C in performing the transactions M and N.

In implementing the foregoing, the process 610 determines a reference device configuration 710 to which workload descriptions for various transactions 140 are scaled, converted, or normalized. This enables a true "apples to apples" comparison and/or aggregation of workload descriptions that may be specified in terms of different devices 125.

The foregoing is presented in terms of analyzing action costs borne by processors, but those skilled in the art will recognize that these teachings are illustrative in nature, and can be readily extended to analyzing, simulating, or otherwise modeling other performance characteristics of microprocessors or other computer-related components, such as devices 125 that may support disk input/output (IO) functions, network functions, or the like. Thus, the discussion herein centering on compute action costs (e.g., processor cycles) can be extended to other types of action costs associated with processing transactions on any device.

Turning specifically to disk IO action costs, while compute action costs are normalized to a reference CPU configuration 710, at this stage of the workload aggregation process 600, it may be desired to determine the average IO size for all disk IO costs which possess the same IO operation (read or write) and IO pattern (random or sequential). This approach may reduce the dimensionality of the aggregation buckets for disk IO actions.

For example, suppose there are only three unique disk IO actions in the application model. Disk IO action #1 has workload description 10 KB random read, disk IO action #2 has workload description 20 KB random read, and disk IO action #3 has workload description 4 KB sequential write. In this example, there would be an aggregation bucket for each action since each action has a different workload description. Instead, since there are two random read actions differing only in their size it may be advantageous to perform aggregation of all random read actions independent of their sizes.

To enable this aggregation, the process 610 could determine the average 10 size weighted by the relative frequency of each action occurrence. For example, if each unique action occurs with the same frequency, then the weighted average IO size is (10 KB+20 KB)/2=15 KB. So later when the aggregation process 600 is performed, the random read actions can be combined as two 15 KB random read disk actions. Also, note that unlike the case for compute actions 145, no specific disk configuration is referenced in the workload description of the disk IO action. The advantage of bucketizing is to reduce the overall time to perform preconditioning. One trade-off of bucketizing is the potential to introduce further error in the workload approximation, but this error may be worth trading in exchange for the reduction in overall time to perform the preconditioning process 320.

Returning to the e-commerce example discussed above, suppose the workload description of the browse transaction 140 provided by the web service 135 is specified in terms of a relatively "slow" processor, and the workload description of the purchase transaction 140 is specified in terms of a relatively "fast" processor. In block 610, these different processor costs for the browse and purchase transactions 140 are rescaled to costs on the same reference device configuration 710, which can be the "fast" processor, the "slow" processor, or a third processor.

3. Aggregate Action Costs

If two or more different types of transactions 145 (e.g., open mail and send mail in the e-mail example, or browse and purchase in the e-commerce example) are part of the same service 135, then in block 615, the workload aggregation process 600 assigns a relative weight to each of the actions costs to reflect how frequently the actions 145 occur relative to one another. This weighting enables the workload aggregation process 600 account for how much each type of transaction 140 contributes to the overall cost or workload demanded by the service 135.

For each type of transaction 140 belonging to the same service 135, the workload aggregation process 600 aggregates the respective rescaled action costs 705 of the sample transactions 510, as weighted by their frequency of occurrences relative to one another. The variables that the workload aggregation process 600 uses to perform this aggregation include an arbitrary interval of time 715 (T) over which this weighing calculation is computed, chosen by the modeling engine 105. The workload aggregation process 600 also considers the rate of occurrence 505 (Rate) for the various types of transactions 510. The workload aggregation process 600 also uses the sample count N, which was discussed above. Finally, the workload aggregation process 600 considers the rescaled action cost 705 of each action 145, as computed by process 610.

Equation 3.0 below expresses the aggregated compute cost on a given processor, in terms of cycles, for performing a given type of transaction 140 as measured over a given interval of time T, as follows:

$$\text{Cost} = T * \text{Rate} * \frac{1}{N} * \sum_{i=1}^{N} Cycles_i$$

Applying the above teachings to the e-commerce example discussed herein, assume that on a given reference device configuration 710, the cost of each sample browse transaction 510 is 1000 cycles and the cost of each sample purchase transaction 510 is 2000 cycles. Next, recall that browse transactions 510 occur at a rate of 200 transactions per second, and that purchase transactions 510 occur at a rate of 100 transactions per second. Assume that the variable T is chosen as one millisecond, and that two samples are chosen for N, as above. Computing the costs of the browse transaction 510 and the purchase transaction 510 separately for convenience, the variable Rate for the browse transaction 510 is 200 transactions per second, and the variable Cycles is 1000 cycles per transaction.

Inserting the above variables into Equation 3.0 above yields the processor cost for a browse transaction 510 under these conditions as:

$$\text{Cost} = T * \text{Rate} * \frac{1}{N} * \sum_{i=1}^{N} Cycles_i$$

Cost = (1 ms) * (200 trans/s) * (1000 cycles/trans) * (s/1000 ms)

Cost = 200 cycles

Similarly, for the purchase transaction 510, the variable Rate is 100 transactions per second, and the variable Cycles is 2000 cycles per transaction. Thus, inserting the above variables into Equation 3.0 above yields the processor cost for a purchase transaction under these conditions as:

$$\text{Cost} = T * \text{Rate} * \frac{1}{N} * \sum_{i=1}^{N} Cycles_i$$

Cost = (1 ms) * (100 trans/s) * (2000 cycles/trans) * (s/1000 ms)

Cost = 200 cycles

Therefore, the total or aggregated processor cost 720 of all transactions 510 supported by the web service 135, which is assumed to offer browse and purchase transactions 140, is the sum of the respective aggregated costs for the browse and purchase transactions 510, i.e., 400 cycles over the chosen one millisecond interval.

In the case of disk input/output (IO) workload, these teachings can be extended to aggregating action costs associated with respective buckets for each type of IO pattern (random or sequential) and IO operation (read or write). These teachings can readily be extended to other aspects of disk IO operations, network-related operations, or the like.

4. Evaluate Device Models

In block 620, for each instance of a given device 125, the workload aggregation process 600 uses a device model 110 to evaluate the total action latency 230 of all the transactions 145 mapped to that device 125. The process 620 also uses the device model 110 to evaluate the instantaneous utilization level 725 experienced by the device 125 when processing all transactions 145 mapped to that device 125.

The total action latency 230 and the instantaneous utilization 725 of the aggregated action cost are both sent from the process 620 to a process 730, which computes the average, overall device utilization 235 (avg_util) for this device 125 when processing the transactions 140. The process 730 computes the average device utilization 235 due to all transactions by multiplying the instantaneous utilization level 725 (inst_util) of the device 125 by the total action latency 230 (latency), and then dividing by the arbitrary time interval T. Equation 4.0 expresses this calculation as follows:

avg_util=inst_util*latency/T

Applying the above teaching to the e-commerce example discussed herein, recall that the process 615 earlier computed the total aggregated cost 720, in terms of processor cycles, of all transactions 510 mapped to the given device 125. Assume that the device model 110 for a given processor shows that this processor would take 4.0 milliseconds to process the aggregated action cost 720. Assume further that the device model 110 indicates that the instantaneous utilization level 725 of the processor when processing the aggregated action cost 720 is 80%. Therefore, the variable latency referenced above is 4.0 milliseconds, the variable inst_util is 80%, and the variable T is assumed to be 1 millisecond. Inserting these values into Equation 4.0 above yields an overall device utilization 235 (avg_util) as follows:

avg_util=inst_util*latency/T avg_util=80%*4.0 ms/1 ms avg_util=320%

As before with the pseudo-simulation process 400, the 320% average device utilization 235 indicates to the planners 215 and/or the model wizard 150 that approximately four devices 125 having performance characteristics similar to the device 125 that was modeled should optimally support the workload assigned to the initial performance scenario 205. It is noted also that the parameters input into the e-commerce example discussed herein were chosen so that the pseudo-simulation process 400 and the workload aggregation process 600 both resulted in the same device utilization 235. As discussed further below, it is possible for the planners 215 and/or the model wizard 150 to execute the preconditioning process 320 using different techniques (i.e., either the pseudo-simulation process 400 or the workload aggregation process 600) and with different inputs. In this case, the different processes 400 or 600 may indicate different device utilizations 235 due to differing methods of approximation.

Comparison of Preconditioning Methods

As discussed above, the teachings herein provide two complementary processes that offer advantages or benefits in particular scenarios that may be encountered when performing simulations as part of planning a deployment. In summary, the pseudo-simulation process 400 passes the respective action cost of each sample transaction 140 into the device model 110 for a given device 125 to determine the instantaneous device utilization level 520 and action latency 230 for that sample transaction 140. Afterwards, the pseudo-simulation process 400 aggregates the instantaneous device utilization levels due to all samples determine the average device utilization 520. In contrast, the workload aggregation process 600 aggregates the respective action costs 705 of all sample transactions 140 mapped to a given device 125, and afterwards passes this aggregated action cost 720 into a device model 110 for that given device 125 to determine the average device utilization 235.

Returning to FIG. 3, the optimization process 325 may interact with the simulation preconditioning process 320. In doing so, process 325 may propose a number of different performance scenarios 205 to the simulation preconditioning process 230. In these different performance scenarios 205, the numbers and types of deployed devices 125 may change. Also, the mappings of services 135 to devices 125 may change. Thus, the simulation preconditioning process 320 may be repeated to determine how these changes would modify the performance of the performance scenario 205 being simulated.

For example, in the e-commerce example discussed above, the slow processor may be replaced by the fast processor, e.g., the web service 135 may be remapped to a different device 125, and/or the database service 135 may be mapped onto the same device 125 as the web service 145. If the simulation preconditioning process 320 is performed using the workload aggregation process 600, then only the last process 620 in FIG. 6 is repeated to estimate the device utilization 235 of the fast processor.

In general, using the workload aggregation process 600, any change in device 125 involves only the device model 110 being re-evaluated (process 620 in FIG. 6), since the aggregated action cost 720 does not change because of the new device 125. In other words, the workload aggregation process 600 does not introduce device-specific modeling until process 620, the last phase of the workload aggregation process 600. The previous three phases (processes 605, 610, and 615) of the workload aggregation process 600 are relatively device-independent and focus on gathering statistics relating to the action costs alone.

It should be emphasized that the device model 110 for each device instance 125 is only evaluated once using the workload aggregation process 600. This is to be contrasted with the pseudo-simulation process 400 which evaluates the device model 110 a number of times in proportion to the number of transaction samples 510 generated for each device instance 125. Therefore, in some performance scenarios, pseudo-simulation process 400 may involve orders of magnitude more device model evaluations than workload aggregation process 600.

In some circumstances, the pseudo-simulation process 400 offers benefits or advantages. The pseudo-simulation process 400 permits the modeling engine 105 to be decoupled from particular features or characteristics of specific devices 125 when desired. More particularly, it may be desirable in some instances to separate the implementation framework of particular device models 110 from the implementation framework of the modeling engine 105. It may further be desirable to insulate the modeling engine 105 from the behavior of device models 110, and for the details of how a particular device 125 behaves to be restricted to the scope of the device models 110 itself. The modeling engine 105 thus would process the outputs of the device models 110, for example, by receiving an indication of how long it would take that device 125 to perform a given action 145.

The workload aggregation process 600 may introduce additional approximations into device behavior beyond those approximations which are introduced by the pseudo-simulation process 400. That is, the workload aggregation process 600 is potentially less accurate than the pseudo-simulation process 400, a trade-off for the time reduction achieved by the workload aggregation process 600. In the case of compute actions 145, the workload aggregation process 600 succeeds in preserving the same device behavior as exhibited by the pseudo-simulation process 400, and so there is no loss in relative accuracy. However, in the case of disk IO actions, the workload aggregation process 600 may introduce approximations which reduce the process time, but also reduce the accuracy in relation to the pseudo-simulation process 400. In some cases, the workload aggregation process 600 may not be possible even when the pseudo-simulation process 400 is possible.

The pseudo-simulation process 400 offers advantages when the performance scenario 205 includes devices 125 that exhibit non-linear behavior. More particularly, the workload aggregation process 600 assumes that device models 110 will behave linearly when presented with varying inputs. For example, suppose the action cost of a purchase transaction 130 is C1 and the action cost of a browse transaction 130 is C2. If a given device 125 can execute action cost C1 is X seconds and action cost C2 in Y seconds, then the workload aggregation process 600 assumes that the device 125 can execute both the purchase transaction and the browse transactions in X+Y seconds. This assumption may not account for factors such as overhead associated with swapping tasks or processes, or the like.

On the other hand, the pseudo-simulation process 400 does not assume linear behavior of device models 110, since each action 145 is independently evaluated against the device model 110 and therefore aggregation of action costs is not necessary. Where the above factors, such as overhead associated with task swapping, are to be accounted for in the modeling, the pseudo-simulation process 400 may offer advantages.

Terminology

Performance Scenario

A performance scenario 205 specifies inputs to the simulation which includes the usage profile 210 and deployment characteristics. The usage profile 210 specifies the quantity and behavior of clients including the rate at which they perform transactions 140. Deployment characteristics include information about the topology, the type of software components and their mapping to device configurations 125, and the type and quantity of device configurations 125.

Device

A device instance 125 is a device configuration instantiated in a performance scenario 205. An example of a device configuration is a specific fast processor or a specific slow disk drive.

Transaction

An application model 120 defines the canonical operations which can be performed by a client. A client can be a human user or a computer program. These canonical operations are referred to as transaction types. The client profile and service mapping determine the arrival rate of each transaction type to each device instance. This rate is referred to as the transaction rate.

Action

An action is a unit of workload performed by a device 125 to process a transaction 140. The unit of workload is referred to as the action cost 145. Device types (processor, disk, and network devices) bifurcate actions into action types (compute, disk IO, or communication). Each transaction type specifies action costs 145 of each action type on a given services 135.

Service

An application model 120 defines the software services which support certain transaction types. The performance scenario 205 specifies a mapping of software services 135 to device instances 125.

Figure 8:
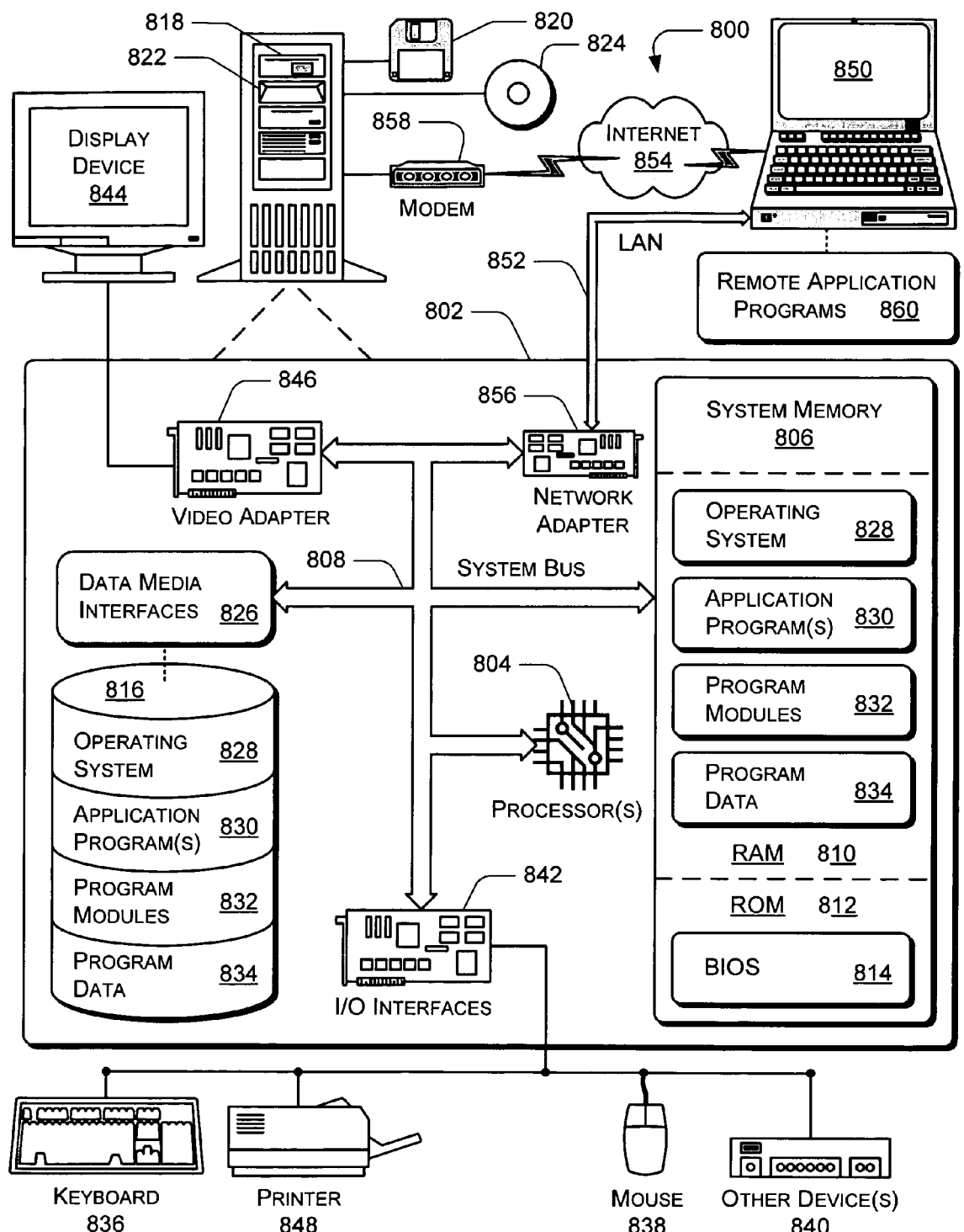
FIG. 8 is a block diagram of an overall computing environment suitable for practicing the teachings herein.

FIG. 8 illustrates an exemplary computing environment 800 within which systems and methods for reconditioning input while simulating deployments of computer software, as well as the computing, network, and system architectures described herein, can be either fully or partially implemented. Exemplary computing environment 800 is only one example of a computing system and is not intended to suggest any limitation as to the scope of use or functionality of the architectures. Neither should the computing environment 800 be interpreted as having any dependency or requirement relating to any one or combination of components illustrated in the exemplary computing environment 800.

The computer and network architectures in computing environment 800 can be implemented with numerous other general purpose or special purpose computing system environments or configurations. Examples of well known computing systems, environments, and/or configurations that may be suitable for use include, but are not limited to, personal computers, server computers, client devices, hand-held or laptop devices, microprocessor-based systems, multiprocessor systems, set top boxes, programmable consumer electronics, network PCs, minicomputers, mainframe computers, gaming consoles, distributed computing environments that include any of the above systems or devices, and the like.

The computing environment 800 includes a general-purpose computing system in the form of a computing device 802. The components of computing device 802 can include, but are not limited to, one or more processors 804 (e.g., any of microprocessors, controllers, and the like), a system memory 806, and a system bus 808 that couples the various system components. The one or more processors 804 process various computer executable instructions to control the operation of computing device 802 and to communicate with other electronic and computing devices. The system bus 808 represents any number of several types of bus structures, including a memory bus or memory controller, a peripheral bus, an accelerated graphics port, and a processor or local bus using any of a variety of bus architectures.

Computing environment 800 includes a variety of computer readable media which can be any media that is accessible by computing device 802 and includes both volatile and non-volatile media, removable and non-removable media. The system memory 806 includes computer readable media in the form of volatile memory, such as random access memory (RAM) 810, and/or non-volatile memory, such as read only memory (ROM) 812. A basic input/output system (BIOS) 814 maintains the basic routines that facilitate information transfer between components within computing device 802, such as during start-up, and is stored in ROM 812. RAM 810 typically contains data and/or program modules that are immediately accessible to and/or presently operated on by one or more of the processors 804.

Computing device 802 may include other removable/non-removable, volatile/non-volatile computer storage media. By way of example, a hard disk drive 816 reads from and writes to a non-removable, non-volatile magnetic media (not shown), a magnetic disk drive 818 reads from and writes to a removable, non-volatile magnetic disk 820 (e.g., a "floppy disk"), and an optical disk drive 822 reads from and/or writes to a removable, non-volatile optical disk 824 such as a CD-ROM, digital versatile disk (DVD), or any other type of optical media. In this example, the hard disk drive 816, magnetic disk drive 818, and optical disk drive 822 are each connected to the system bus 808 by one or more data media interfaces 826. The disk drives and associated computer readable media provide non-volatile storage of computer readable instructions, data structures, program modules, and other data for computing device 802.

Any number of program modules can be stored on RAM 810, ROM 812, hard disk 816, magnetic disk 820, and/or optical disk 824, including by way of example, an operating system 828, one or more application programs 830, other program modules 832, and program data 834. Each of such operating system 828, application program(s) 830, other program modules 832, program data 834, or any combination thereof, may include one or more embodiments of the systems and methods described herein.

Computing device 802 can include a variety of computer readable media identified as communication media. Communication media typically embodies computer readable instructions, data structures, program modules, or other data in a modulated data signal such as a carrier wave or other transport mechanism and includes any information delivery media. The term "modulated data signal" refers to a signal that has one or more of its characteristics set or changed in such a manner as to encode information in the signal. By way of example and not limitation, communication media includes wired media such as a wired network or direct-wired connection, and wireless media such as acoustic, RF, infrared, other wireless media, and/or any combination thereof.

A user can interface with computing device 802 via any number of different input devices such as a keyboard 836 and pointing device 838 (e.g., a "mouse"). Other input devices 840 (not shown specifically) may include a microphone, joystick, game pad, controller, satellite dish, serial port, scanner, and/or the like. These and other input devices are connected to the processors 804 via input/output interfaces 842 that are coupled to the system bus 808, but may be connected by other interface and bus structures, such as a parallel port, game port, and/or a universal serial bus (USB).

A display device 844 (or other type of monitor) can be connected to the system bus 808 via an interface, such as a video adapter 846. In addition to the display device 844, other output peripheral devices can include components such as speakers (not shown) and a printer 848 which can be connected to computing device 802 via the input/output interfaces 842.

Computing device 802 can operate in a networked environment using logical connections to one or more remote computers, such as remote computing device 850. By way of example, remote computing device 850 can be a personal computer, portable computer, a server, a router, a network computer, a peer device or other common network node, and the like. The remote computing device 850 is illustrated as a portable computer that can include any number and combination of the different components, elements, and features described herein relative to computing device 802.

Logical connections between computing device 802 and the remote computing device 850 are depicted as a local area network (LAN) 852 and a general wide area network (WAN) 854. Such networking environments are commonplace in offices, enterprise-wide computer networks, intranets, and the Internet. When implemented in a LAN networking environment, the computing device 802 is connected to a local network 852 via a network interface or adapter 856. When implemented in a WAN networking environment, the computing device 802 typically includes a modem 858 or other means for establishing communications over the wide area network 854. The modem 858 can be internal or external to computing device 802, and can be connected to the system bus 808 via the input/output interfaces 842 or other appropriate mechanisms. The illustrated network connections are merely exemplary and other means of establishing communication link(s) between the computing devices 802 and 850 can be utilized.

In a networked environment, such as that illustrated with computing environment 800, program modules depicted relative to the computing device 802, or portions thereof, may be stored in a remote memory storage device. By way of example, remote application programs 860 are maintained with a memory device of remote computing device 850. For purposes of illustration, application programs and other executable program components, such as operating system 828, are illustrated herein as discrete blocks, although it is recognized that such programs and components reside at various times in different storage components of the computing device 802, and are executed by the one or more processors 804 of the computing device 802.

Although embodiments for preconditioning the stochastic simulation of computer system performance have been described in language specific to structural features and/or methods, it is to be understood that the subject of the appended claims is not necessarily limited to the specific features or methods described. Rather, the specific features and methods are disclosed as illustrative implementations for preconditioning input while simulating deployments of computer software.

The invention claimed is:

1. One or more computer-readable storage media encoding instructions that when executed instruct a processor to perform a method of simulating a computer system performance scenario, the method comprising:

generating one or more sample transactions for each of a transaction type;

calculating an action latency representing a time over which a device processes each sample transaction;

calculating an instantaneous device utilization representing a level of device utilization when processing each sample transaction;

calculating an overall device utilization representing a level at which the device is utilized in a computer system performance scenario, the overall device utilization being calculated by multiplying the action latency, the instantaneous device utilization, and a frequency of each transaction type;

modifying the performance scenario based at least in part on the overall device utilization;

simulating the computer system performance scenario; and providing results of the simulation to a user.

2. The computer-readable storage media of claim 1, further comprising performing a pseudo-simulation process.

3. The computer-readable storage media of claim 1, further comprising performing a workload aggregation process.

4. The computer-readable storage media of claim 1, wherein modifying the performance scenario includes adding at least one device to the performance scenario.

5. The computer-readable storage media of claim 1, wherein modifying the performance scenario includes substituting at least one device specified in the performance scenario with at least a further device.

6. The computer-readable storage media of claim 1, wherein modifying the performance scenario includes remapping at least one service to a different device in the performance scenario.

7. The computer-readable storage media of claim 1, further comprising repeating only a portion of the simulating after modifying the performance scenario.

8. One or more computer-readable storage media encoding instructions that when executed instruct a processor to perform a method of simulating a computer system performance scenario the method comprising:

generating at least one sample transaction for each of a transaction type associated with a simulated deployment of at least one device as part of a simulated deployment of software;

determining a utilization weighting statistic representing a duration of time over which the device would perform an action associated with the sample transaction;

determining an instantaneous device utilization statistic representing a level of utilization experienced by the device when performing the action;

determining an overall device utilization statistic by multiplying the utilization weighting statistic by the instantaneous device utilization statistic and a frequency of each transaction type;

modifying a computer performance scenario utilizing the overall device utilization statistic;

simulating the computer performance scenario; and providing results of the simulation to a user.

9. The computer-readable storage media of claim 8, further comprising generating at least a second sample transaction associated with the simulated deployment.

10. The computer-readable storage media of claim 9, further comprising determining at least a transaction latency statistic representing a duration of time over which the device would execute the second sample transaction.

11. The computer-readable storage media of claim 10, wherein determining the transaction latency statistic includes evaluating a device model.

12. The computer-readable storage media of claim 9, further comprising determining a second device utilization statistic representing a level of utilization experienced by the device when performing the second sample transaction.

13. The computer-readable storage media of claim 9, further comprising determining a utilization weighting statistic indicating how much the sample transaction and the second sample transaction respectively contribute to a level of utilization experienced by the device when performing the sample transaction and the second sample transaction.

14. The computer-readable storage media of claim 9, wherein determining the overall device utilization statistic is based on the device utilization statistic and on at least a second device utilization statistic representing a level of utilization experienced by the device when performing a second sample transaction.

15. The computer-readable storage media of claim 9, wherein determining the device utilization statistic includes evaluating a device model.

16. One or more computer-readable storage media encoding instructions that when executed instruct a processor to perform a method of simulating a computer system performance scenario the method comprising:
    generating a plurality of sample transactions associated with a simulated deployment;
    determining respective costs associated with performing at least one action associated with each of the sample transactions on a reference device;
    aggregating the respective costs associated with performing at least one action into an aggregated action cost;
    determining an instantaneous device utilization statistic representing a level at which the device would be utilized when performing the aggregated action cost;
    determining a action latency statistic representing a duration of time over which the device would execute when performing the aggregated action cost;
    determining an overall device utilization statistic by multiplying the instantaneous device utilization statistic by the action latency statistic and dividing by a time interval chosen by a modeling engine, and storing the overall device utilization statistic on a computer storage media;
    modifying a computer performance scenario utilizing the overall device utilization statistic;
    simulating the computer performance scenario; and
    providing results of the simulation to a user.

17. The computer-readable storage media of claim 16, wherein determining the respective costs includes determining how many cycles the reference device would execute to perform each of the sample transactions.

18. The computer-readable storage media of claim 17, wherein the respective costs associated with performing at least one action are determined by multiplying a number of cycles the reference device executes to perform the sample transactions, a respective rate of occurrence for each of the sample transactions, and a time interval chosen by a modeling engine.

19. The computer-readable storage media of claim 16, wherein aggregating the respective costs associated with performing at least one action includes determining a respective rate of occurrence statistic for each of the sample transactions.

20. The computer-readable storage media of claim 16, wherein determining the instantaneous device utilization level statistic includes using a device model for the device.

* * * * *